Figure 1:
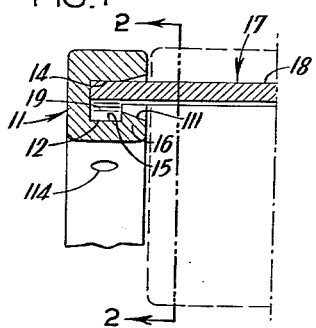

Aug. 21, 1962  A. E. BRATT  3,050,353
CAGE FOR ROLLING BEARINGS
Filed Jan. 24, 1961
2 Sheets-Sheet 1

INVENTOR:
AXEL ERLAND BRATT
BY Howson & Howson
ATTYS.

Aug. 21, 1962    A. E. BRATT    3,050,353
CAGE FOR ROLLING BEARINGS
Filed Jan. 24, 1961    2 Sheets-Sheet 2

INVENTOR:
AXEL ERLAND BRATT
BY Howson & Howson
ATTYS.

United States Patent Office 3,050,353
Patented Aug. 21, 1962

3,050,353
CAGE FOR ROLLING BEARINGS
Axel Erland Bratt, Molndal, Sweden, assignor to Aktiebolaget Svenska Kullagerfabriken, Goteborg, Sweden, a corporation of Sweden
Filed Jan. 24, 1961, Ser. No. 84,656
Claims priority, application Sweden Feb. 3, 1960
8 Claims. (Cl. 308—217)

The present invention relates to a cage for rolling bearings. In order to simplify the description of the invention it has been described as related to a cylindrical rolling bearing having flanges on the outer race ring. The invention is, however, not limited to this type of bearing only but may be used in connection with most kinds of roller bearings and ball bearings.

The cage according to the invention is of the so-called window-type, i.e. it comprises in principle a cylindrical mantle in which rectangular holes, so-called pockets, have been formed. The members between the pockets separating the rollers are axially directed. The pitch surface of the cylindrical mantle can be located either at, outside of, or inside of the pitch circle for the set of rollers. In order to facilitate the mounting of cylindrical roller bearings having flanges on the outer race ring it is desirable that the race ring, the cage and the rollers form a self-contained unit and that the roller retaining portion of the cage therefore be located inside of the pitch circle. The simplest type of cage is made in a single piece and the diameter of the mantle is less than the pitch diameter and the width of the pockets is less than the roller diameter. It is, however, impossible, or at least difficult to assemble a cage of this kind since it must be put in position after the rollers have been inserted in the outer race ring. Since portions of the rollers are closer to the axis of rotation of the bearing than the cage itself, it is difficult to insert the cage past the rollers. Different methods of attaining this result have been proposed, for instance cages have been suggested which comprise merely a cylindrical mantle of such thin metal that the cylinder can be deformed to permit its introduction. Another method of solving the problem of assembling the bearing is to make the cage of several parts which are interconnected after being put in place in the bearing.

The cage according to the present invention is of the last mentioned general type and comprises one or more axially extending separating members which are connected at at least one side with a side ring. A cage of this type is characterized thereby that the cross bars have resilient members which resiliently engage two opposed surfaces in a groove in the said ring and thereby interlock the cross bars and the said ring, the said resilient members being of such dimension that they substantially fill the entire circumference of the said groove.

Figure 2:
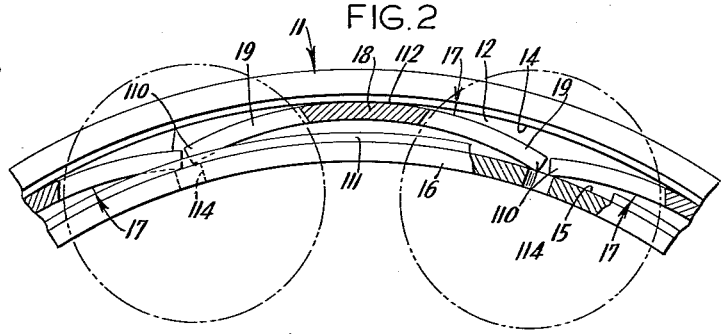
Figure 3:
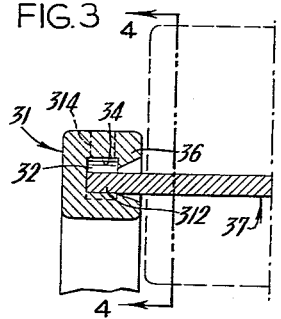
Figure 4:
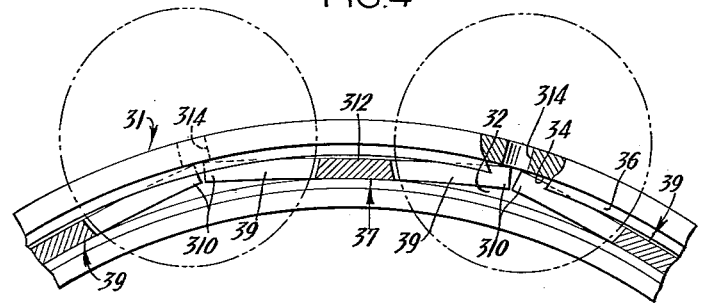
Figure 9:
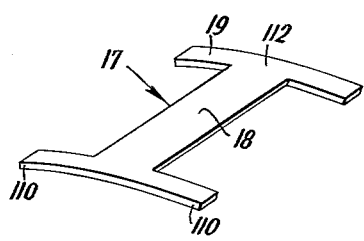
Figure 10:
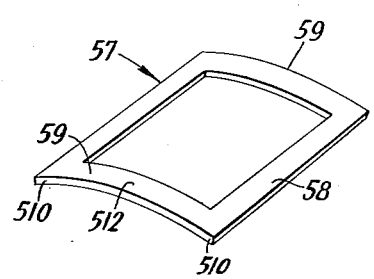
Figure 11:
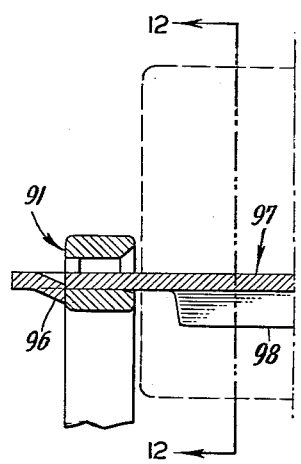
Figure 12:
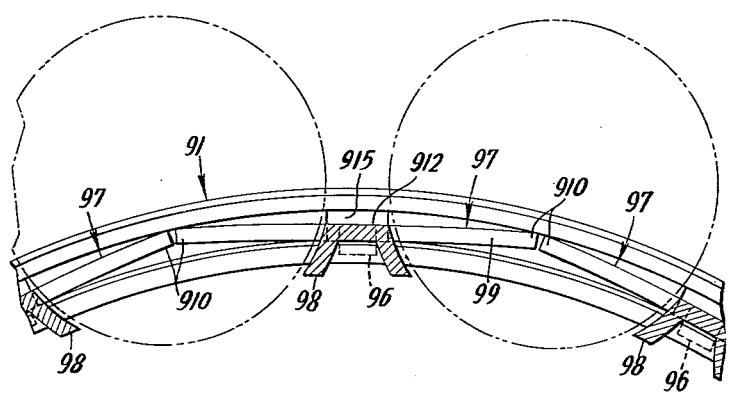
Figure 13:
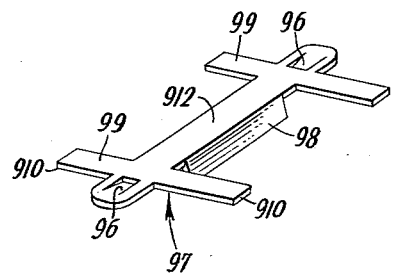

The invention is described in the following with reference to the accompanying drawings in which FIG. 1 shows a cross section through a side ring and a cage element of one form of the invention. FIG. 2 shows a view partly in section of the same cage in the direction II—II indicated in FIG. 1. FIGS. 3 and 4 represent corresponding views of another form of the invention in which FIG. 4 is a view in the direction IV—IV of FIG. 3. FIGURES 5 and 6 and FIGURES 7 and 8 show views corresponding to FIGURES 1 and 2 of other forms of the invention, FIGS. 6 and 8 being views in the direction VI—VI and VIII—VIII in FIGURES 5 and 7 respectively. FIGURES 9 and 10 show two different typs of cage element. FIGURES 11, 12, and 13, finally, show still another form of the invention. FIG. 11 is a section through a portion of a cage and FIG. 12 an end view thereof, while FIG. 13 shows in perspective a cage element as used in the form of the invention illustrated in FIGURES 11 and 12.

With reference to FIGURES 1, 2 and 9 the numeral 11 designates a side ring which is almost square in cross section. The ring 11 is provided with an annular groove 12 having two concentric cylindrical surfaces 14 and 15, the said groove opening towards the inner side face of the ring and the said opening being somewhat constricted by a wall 16. A cage element 17 of H-shape (see FIG. 9) is inserted in the groove. The cage element 17 consists of a cross bar 18 interconnecting two resilient members in the shape of ring segments 19 curved to a radius smaller than that of the groove 12. FIG. 2 illustrates three elements 17 inserted in the groove 12. In order to simplify the assembly of the cage the outer surface 111 of the wall 16 is made conical. The curvature of the segments is such that their ends 110 engage the inner surface 15 of the groove 12 under pressure, while their centre portions 112 are pressed against the outer surface 14 of the groove.

When assembling the cage the ends 110 are brought into engagement with the conical surface 111 and the portion 112 is pressed inwards sufficiently so that the ring segments can pass over the wall 16. The ends 110 then spring down into position behind the wall 16, and the portion 112 presses against the inner surface 14 of the groove 12. The friction due to the pressure exerted between the segments and the walls of the groove in the side ring prevent peripheral relative displacement between these members and keeps the cage rigid. As mentioned above the segments are positively fixed axially thereby that the ends 110 interlock with the wall 16. The width of the groove behind the wall 16 is only slightly greater than the width of the ends 110 of the segments, whereby the cross bars 18 will be accurately positioned perpendicular to the side ring 11. Holes 114 are provided in the inner cylindrical wall of the side ring opposite the ends 110 of the segments. It is then possible to introduce a tool into two holes related to the same segment and press the ends 110 thereof radially outwards so that they can pass over the wall 16, whereafter the cage element can be separated from the side ring.

When assembling a bearing with a cage having two similar side rings 11 the rollers and cage elements 17 are first located in position in the outer race ring after which the side rings are snapped on. In bearing assemblies where for example, the outer race ring is provided with radially inwardly projecting side flanges to limit axial movement of the roller elements, the cage elements 17 may be formed integrally with one of the side rings 11. In order to assemble a cage of this type, the ring segments 19 at the free ends of the cage elements 17 are displaced radially inwardly to clear the rolling elements and permit insertion of the cage from one axial end of the bearing assembly. When the ring segments 19 at the free end of the cage elements 17 have been displaced axially to the axial end of the bearing assembly opposite that from which the cage was introduced, the ring segments 19 spring radially outwardly adjacent the end face of the rolling elements and then the other side ring 11 can be snapped on in the manner indicated above.

The forms of the invention illustrated in FIGS. 3 and 4 differ from that described above thereby that the ring segments 39 of the cage elements 37 have a radius of curvature greater than that of the outer surface 34 of the annular groove 32 in the said ring 31. The ring segments 39 are practically plane before being assembled in the side rings and their ends 310 resiliently engage the outer surface 34 of the groove behind the wall 36 which is in this case located at the outer portion of the annular groove while their middle portions 312 engage the inner surface 35 of the groove. The cage elements are thereby fixed in an axial direction. The cage is assembled and dismantled in a manner similar to that of the cage described above, i.e. by introducing a tool in the holes 314 and pressing the ends 310 inwards.

Figure 5:
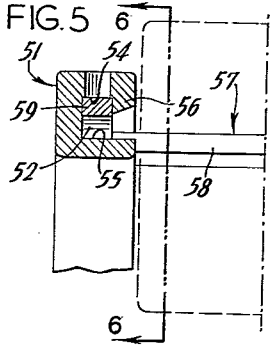
Figure 6:
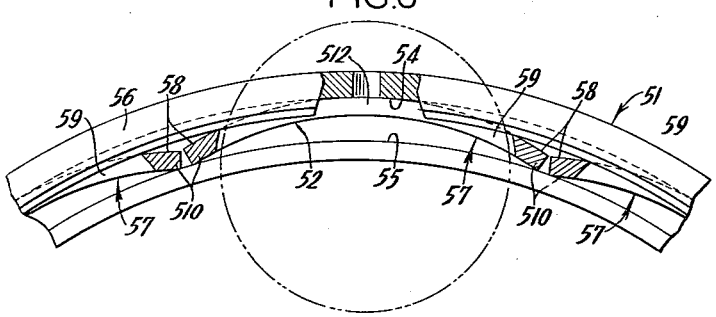

The form of the invention illustrated in FIGURES 5, 6 and 10 differs from those described above thereby that the cage elements 57 are quadrilateral instead of being H-shaped. They consist of two ring segments 59 having their ends 510 interconnected by cross bars 58. The radius of curvature of the ring segments 59 is less than that of the outer surface 54 of the annular groove 52. In consequence hereof, the ends 510 engage the inner surface 55 of the groove 52 in the said ring 51 and their middle portions 512 resiliently engage the surface 54 behind the wall 56. The difference between the two earlier described forms and this form of the invention is thus that the members which fix the cage members axially are the ends of the ring segments while in the last mentioned form the cage elements are fixed in place by the middle portion of the ring segments.

Figure 7:
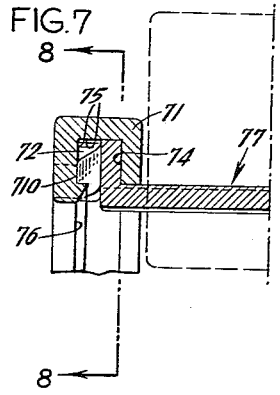
Figure 8:
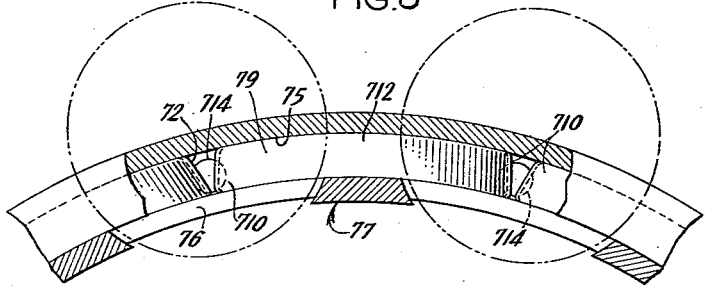

The form of the invention illustrated in FIGURES 7 and 8 differs from those previously described thereby that the ring segments 79 are resilient in an axial direction. The cage is assembled by first locating the rollers and thereafter the side rings 71 in position in the outer race ring. The cage elements 77 can then be inserted from inside radially outwards into the groove 72 past the wall 76. The ends 710 of the segments 79 resiliently engage the plane surface 75 of the groove 72 and the middle portions 712 engage the surface 74. The cage elements are prevented from dropping out by the cylindrical wall 76. For dismantling the cage holes 714 are provided which serve the same purpose as those described in connection with the earlier forms of the invention.

Still another form of the invention is described in connection with FIGURES 11, 12 and 13. The cage member 97 comprises two resilient ring segments 99 and a cross bar 98 interconnecting them and projecting axially past the ring segments.

Hooks 96 are provided in the projecting portions which latter pass through holes 915 in the side rings 91, when the cage is being assembled. The ends 910 of the ring segments, which are resilient in a radial direction, then press the middle portion 912 of the segment against the side ring and the hooks 96 fix the cage elements in an axial direction. In order to eliminate all play between the parts, the ends 910 of the ring segments may be made slightly curved outwards in an axial direction so that they flex somewhat when being assembled and thereby force the hook 96 against the side ring. When dismantling the cage the hook is forced radially outwards sufficiently to enable the cage members to be disengaged from the side ring.

In addition to the advantages already mentioned it may be pointed out that the cage is easy to assemble since no rivets, welding or any similar fixed connecting elements are required. For the same reason it is comparatively easy to dismantle the cage. It can also be manufactured economically, especially in large sizes in which a cage of conventional type would require large expensive dies.

I claim:

1. A cage for the rolling elements of rolling bearings comprising a pair of spaced side rings having inner confronting surfaces, means defining an annular groove in the inner surface of at least one of said side rings providing two opposed surfaces, a plurality of axially extending cage elements mounted between said rings and including cross bars spaced apart circumferentially to provide pockets for the rolling elements and a resilient member in the form of a ring segment connected to at least one end of each of said cross bars, said resilient members resiliently engaging said two opposed surfaces in said annular groove to thereby interlock said cage elements with said one ring.

2. A cage according to claim 1 including means defining an annular groove on the inner surface of the other of said rings and wherein each of said cage elements comprises H-shaped members consisting of an axially extending cross bar and circumferentially extending resilient ring segments at opposite ends of said cross bar engaging in said annular grooves.

3. A cage for rolling bodies according to claim 1 characterized thereby that the annular groove in the said ring opens axially in an inward direction and has a wall constricting the said opening and that the ring segments have two opposed surfaces resiliently engaging opposed surfaces of the groove whereby the resilient member is retained in the groove by the said wall.

4. A cage for rolling bearings according to claim 1 characterized thereby that the cage elements in addition to the said resilient members are also provided with portions projecting through openings in the side rings, said projecting portions having members urged into engagement with the side ring under the action of the resilient member to positively fix the cage elements to the side ring.

5. A cage for rolling bearings according to claim 3 characterized thereby that the radius of curvature of the inner surface of the groove is greater than that of the inner surface of the resilient member.

6. A cage for rolling bearings according to claim 3 characterized thereby that the radius of curvature of the outer surface of the groove is less than that of the outer surface of the resilient member.

7. A cage for rolling bearings according to claim 1 characterized thereby that the cage elements comprise separate quadrilateral members consisting of a pair of radially resilient ring segments and cross bars interconnecting the ends of the said pair.

8. A cage for rolling bearings according to claim 3 characterized thereby that the side ring is provided with a number of holes opening into the groove and so disposed relative to the resilient members so that the ends thereof may be engaged by a tool inserted through the said holes.

References Cited in the file of this patent

UNITED STATES PATENTS

| | | |
|---|---|---|
| 1,169,469 | Dunning | Jan. 25, 1916 |
| 1,940,124 | Gibbons | Dec. 19, 1933 |
| 2,969,267 | Gothberg | Jan. 24, 1961 |